(12) United States Patent
Newton

(10) Patent No.: US 6,893,680 B2
(45) Date of Patent: May 17, 2005

(54) COATING COMPOSITION WITH IMPROVED ADHESION AND METHOD THEREFOR

(75) Inventor: David L. Newton, Toledo, OH (US)

(73) Assignee: BASF Corporation, Southfield, MI (US)

( * ) Notice: Subject to any disclaimer, the term of this patent is extended or adjusted under 35 U.S.C. 154(b) by 215 days.

(21) Appl. No.: 10/429,141

(22) Filed: May 2, 2003

(65) Prior Publication Data

US 2004/0071884 A1 Apr. 15, 2004

Related U.S. Application Data

(63) Continuation-in-part of application No. 10/065,370, filed on Oct. 10, 2002, now abandoned.

(51) Int. Cl.$^7$ .............................. B05D 3/02; B05D 3/12; C09D 5/08; C08K 5/521
(52) U.S. Cl. .................... 427/292; 427/388.2; 524/127; 524/141; 524/145; 524/315; 524/361; 524/378; 252/389.23
(58) Field of Search ................................. 524/127, 141, 524/145, 315, 361, 378; 252/389.23; 427/292, 388.2

(56) References Cited

U.S. PATENT DOCUMENTS

| | | | | |
|---|---|---|---|---|
| 3,415,766 A | * | 12/1968 | Jedlicka | 106/14.24 |
| 3,630,790 A | | 12/1971 | Schmidt et al. | 148/6.15 |
| 5,021,489 A | * | 6/1991 | Knight et al. | 524/140 |
| 5,792,806 A | * | 8/1998 | Yamamoto et al. | 524/141 |
| 5,859,154 A | | 1/1999 | Temple et al. | 525/509 |
| 6,458,874 B1 | * | 10/2002 | Newton | 524/140 |
| 6,534,121 B1 | * | 3/2003 | Newton et al. | 427/142 |
| 6,599,965 B2 | * | 7/2003 | Lane et al. | 524/140 |
| 2004/0030088 A1 | * | 2/2004 | Salter et al. | 528/59 |

FOREIGN PATENT DOCUMENTS

| | | | | |
|---|---|---|---|---|
| JP | 57087869 A | * | 6/1982 | B05D/3/10 |
| WO | WO 02/051949 | | 4/2002 | C09D/5/08 |
| WO | WO2004/099323 A1 | * | 11/2004 | C09D/5/00 |

OTHER PUBLICATIONS

"Paint and Coating Additives" 2 pages, internet http://www.lubrizol.com/Coating/specialty/default.asp, retrieved Mar. 8, 2004.*

"Reference Information FDA Complaint Coating Using Lubrizol® 2063" 1 page, internet http://www.lubrizol.com/CoatingsReference/lz2063FDA.asp, retrieved Mar. 8, 2004.*

"Lubrizol® 2063" 1 page, internet http://www.lubrizol.com/CoatingProduct/lz2063.asp, retrieved Mar. 8, 2004.*

"Borchi® Gen HMP" 2 pages, internet linked from http://www.borchers.de/index.cfm?PAGE_ID=197, retrieved Mar. 8, 2004.*

Derwent abstract ACC–NO: 1982–56292E for JP 57087869–A.*

International Search Report PCT/US2004/013108, International Filing Date Apr. 27, 2004.

* cited by examiner

Primary Examiner—Matthew A. Thexton

(57) ABSTRACT

The invention relates to a coating composition demonstrating improved adhesion and method for improving adhesion of a coating composition to metal. The coating and method of the invention provide improved adhesion of a coating when coating is applied directly over metal substrates, especially untreated metal substrates such as galvanized steel, unsanded aluminum and unsanded cold-rolled steel. More particularly, the invention provides a composition comprising (I) an effective amount of a first compound having an acid number of from 70 to 120 mg KOH/g, a hydroxyl number of from 200 to 400 mg KOH/g, a number average molecular weight of from 300 to 700, and which is the reaction product of (a) at least one difunctional carboxylic acid, (b) at least one trifunctional polyol, (c) at least one chain stopper, and (d) phosphoric acid, (II) an effective amount of a second compound comprising a carboxy phosphate ester having the formula:

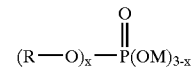

wherein R is an $C_5$–$C_{40}$ aliphatic group in which one or more aliphatic carbon atoms are substituted with lateral or terminal —$COOR^1$ groups, wherein $R^1$ is H, metal, ammonium, $C_1$–$C_6$ alkyl, or $C_6$–$C_{10}$ aryl, M is hydrogen, metal or ammonium and x is a number from 0 to 3, and (III) a compound providing low surface tension and promoting surface wetting of a substrate.

20 Claims, No Drawings

COATING COMPOSITION WITH IMPROVED ADHESION AND METHOD THEREFOR

CROSS REFERENCE TO RELATED APPLICATIONS

This application is a continuation in part of U.S. patent application Ser. No. 10/065,370, filed Oct. 10, 2002 now abandoned.

FIELD OF THE INVENTION

The invention relates to a method for improving adhesion of coating compositions useful in automotive refinish operations and having improved adhesion to metal substrates. More particularly, the coating compositions of the invention are intended for direct use over large areas of untreated metal substrates such as galvanized steel, aluminum and cold-rolled steel.

BACKGROUND OF THE INVENTION

As used herein, "automotive refinish" refers to compositions and processes used in the repair of a damaged automotive finish, usually an OEM provided finish. Refinish operations may involve the repair of one or more outer coating layers, the repair or replacement of entire automotive body components, or a combination of both. The terms "refinish coating" or "repair coating" may be used interchangeably.

Automotive refinishers must be prepared to paint a wide variety of materials. Examples of commonly encountered materials are one or more previously applied coatings, plastic substrates such as RIM, SMC and the like, and metal substrates such as aluminum, galvanized steel, and cold rolled steel. Bare metal and plastic substrates are often exposed as a result of the removal of the previously applied coating layers containing and/or surrounding the defect area. However, it is often difficult to obtain adequate adhesion of refinish coatings applied directly to exposed bare substrates.

Among the many factors influencing the degree of refinish coating/substrate adhesion are the type of exposed substrate, the presence or absence of adhesion promoting pretreatments and/or primers, the size of the exposed area to be repaired, and whether previously applied "anchoring" coating layers surround the exposed repair area.

For example, refinish adhesion is particularly challenging when the exposed substrate is a bare metal such as galvanized iron or steel, aluminum or cold rolled steel. It is especially hard to obtain adequate refinish adhesion to galvanized iron. "Galvanized iron or steel" as used herein refers to iron or steel coated with zinc. "Steel" as used herein refers to alloys of iron with carbon or metals such as manganese, nickel, copper, chromium, molybdenum, vanadium, tungsten and cobalt.

Refinish operations have traditionally used adhesion pretreatments to overcome the adhesion problems associated with the coating of bare metal substrates. Pretreatment as used herein may refer to either mechanical or chemical alterations of the bare metal substrate. Mechanical alterations used to obtain improved adhesion include sanding, scuffing, and the like. Chemical alterations include treatment of the substrate with compositions such as chromic acid conversion coatings, acid etch primers and the like.

Although such pretreatments have obtained improved refinish adhesion, they are undesirable for a number of reasons. Most importantly, pretreatments are inefficient and expensive to apply in terms of material, time, and/or labor costs. Some chemical pretreatments also present industrial hygiene and disposal issues. Finally, the use of some pretreatments such as acid etch primers may contribute to water sensitivity and/or coating failure under test conditions of extreme humidity.

Accordingly, it is highly desirable to eliminate the need for substrate pretreatment as regards the refinish coating of bare metal substrates.

In addition, adhesion to bare metal substrates is improved when the defect area to be repaired is relatively small and is surrounded by previously applied coating layers. Such previously applied coating layers act as an 'adhesion anchor' to the refinish coating. However, many refinish repairs are of a size such that they lack any surrounding adhesion anchors. Moreover, such anchoring adhesion may be completely absent when replacement body parts are painted with a refinish coating.

Accordingly, it would be desirable to obtain refinish adhesion to bare exposed metal lacking any such 'adhesion anchors'.

Finally, improvements in refinish adhesion to bare exposed metal substrates must not be obtained at the expense of traditional refinish coating properties. Such properties include sandability, durability, ambient or low temperature cure, application parameters such as pot life, sprayability, and clean up, and appearance. Illustrative refinish coatings having such properties include urethane coatings, especially two component urethane coating.

Accordingly, it would be desirable to obtain urethane based refinish coatings having improved adhesion to bare metal substrates lacking any pretreatment or adhesion anchors.

SUMMARY OF THE INVENTION

It has unexpectedly been found that the combination of two particular materials provides improvements in adhesion that are better than the adhesion improvement obtained with either material alone. In particular, the invention broadly provides a composition comprising (I) an effective amount of a first compound having an acid number of from 70 to 120 mg KOH/g, a hydroxyl number of from 200 to 400 mg KOH/g, a number average molecular weight of from 300 to 700 and which is the reaction product of (a) at least one difunctional carboxylic acid, (b) at least one trifunctional polyol, (c) at least one chain stopper, and (d) phosphoric acid, (II) an effective amount of a second compound comprising one or more carboxy phosphate esters of the formula:

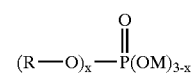

wherein R is an $C_5$–$C_{40}$ aliphatic group in which one or more aliphatic carbon atoms are substituted with lateral or terminal —$COOR^1$ groups, wherein $R^1$ is H, metal, ammonium, $C_1$–$C_6$ alkyl, or $C_6$–$C_{10}$ aryl, M is hydrogen, metal or ammonium, and x is a number from 0 to 3 and (III) a compound providing low surface tension and promoting surface wetting of a substrate.

DETAILED DESCRIPTION OF THE PREFERRED EMBODIMENT

The composition of the invention requires the use of a mixture of a first compound (I) a second compound (II), and a third compound (III), wherein compounds (I), compound (II) and compound (III) cannot be the same. It has unexpectedly been found that the combination of compounds (I), (II) and (III) provides an improvement in refinish adhesion, i.e., the adhesion of a refinish coating to a bare exposed metal substrate, which is better than that obtained with the use of either compound (I) or compound (II) alone or that obtained with the combination of compounds (I) and (II).

Compound (I) is an low molecular weight polyester compound having both acid and hydroxyl functionality. It will generally have a number average molecular weight in the range of from 150 to 3000, preferably from 300 to 1000, and most preferably from 400 to 600. Compound (I) will generally have a polydispersity of from 1.00 to 2.00, with a polydispersity of 1.50 being most preferred.

Suitable compounds (I) will also have an acid number in the range of from 70 to 120 mg KOH/g, preferably from 70 to 100 mg KOH/g, and most preferably from 70 to 80 mg KOH/g.

In addition, suitable compounds (I) will have a hydroxyl number in the range of from 200 to 400 mg KOH/g, more preferably from 300 to 400 mg KOH/g and most preferably from 330 to 360 mg KOH/g.

Compound (I) generally comprises the reaction product of the reaction of (a) at least one difunctional carboxylic acid, (b) at least one trifunctional polyol, (c) at least one chain stopper, and (d) phosphoric acid.

Examples of suitable difunctional carboxylic acids (a) include adipic acid, azeleic acid, fumaric acid, phthalic acid, sebacic acid, maleic acid, succinic acid, isophthalic acid, tetrahydrophthalic acid, hexahydrophthalic acid, dimer fatty acids, itaconic acid, glutaric acid, cyclohexanedicarboxylic acid, and mixtures thereof. Preferred difunctional carboxylic acids (a) are adipic acid and azeleic acid. Adipic acid is most preferred for use as difunctional carboxylic acid (a).

The at least one trifunctional polyol (b) may be branched or unbranched, but branched trifunctional polyols are preferred. Examples of suitable trifunctional polyols (b) are trimethylolpropane, trimethylol ethane, glycerin, 1,2,4-butanetriol, and mixtures thereof. Preferred trifunctional polyols (b) are trimethylolpropane and trimethylol ethane, with trimethylolpropane being a most preferred trifunctional polyol (b).

The at least one chain stopper will generally be a carboxylic acid that is different from the at least one difunctional carboxylic acid (a). Monocarboxylic acids are preferred. Suitable carboxylic acids (c) will preferably contain one or more aromatic structures and will preferably contain some branched alkyl groups. Examples of suitable carboxylic acids (c) include para-t-butyl benzoic acid, benzoic acid, salicylic acid, 2-ethylhexanoic acid, pelargonic acid, isononanoic acid, $C_{18}$ fatty acids, stearic acid, lauric acid, palmitic acid, and mixtures thereof. Preferred carboxylic acids (c) include para-t-butyl benzoic acid, benzoic acid, and 2-ethylhexanoic acid, with para-t-butyl benzoic acid being most preferred.

Phosphoric acid (d) should be added to the reaction mixture in an amount of from 0.03 to 0.20, preferably from 0.05 to 0.15, and most preferably from 0.07 to 0.10. It will be appreciated that while phosphoric acid is most preferred, phosphate esters such as butyl or phenyl acid phosphate and the like are suitable for use as component (d) in the preparation of compound (I).

Polymerization of the reactants may occur at typical esterification conditions, ie., 200–230° C. reaction temperature while continuously removing water as a reaction by-product. Solvents that facilitate the removal of water from the reaction system (those that form an azeotrope) such as xylenes, may be used.

Reactants (a), (b), (c) and (d) will generally be used in a molar ratio of 4.2:4.9:0.01:0.0005 to 5.1:5.6:0.7:0.005, preferably from 4.4:5.0:0.02:0.0008 to 5.0:5.5:0.6:0.003, and most preferably from 4.8:5.2:0.02:0.0009 to 4.9:5.4:0.06:0.002.

A commercially available and most preferred example of compound (I) is Borchigen HMP, commercially available from the Wolff Walsrode division of the Bayer Corporation of Burr Ridge, Ill., U.S.A.

Compound (II) comprises a carboxy phosphate ester having the formula:

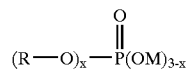

wherein M is hydrogen, metal or ammonium, x is a number from 0 to 3, and R is a saturated or unsaturated $C_5$–$C_{40}$ aliphatic group in which one or more of the aliphatic carbon atoms can be substituted or replaced with a halogen atom (such as fluorine or chlorine), a $C_1$–$C_6$ alkyl group, a $C_1$–$C_6$ alkoxy group, a $C_6$–$C_{10}$ aromatic hydrocarbon group, preferably phenyl or naphthyl, or a $C_6$–$C_{10}$ aromatic hydrocarbon group that is substituted with one or more (preferably 1 to 3) $C_1$–$C_6$ alkyl groups or —$COOR^1$ groups wherein $R^1$ is H, metal, ammonium, $C_1$–$C_6$ alkyl, or $C_6$–$C_{10}$ aryl, or mixtures thereof.

In preferred compounds (II), R will contain one or more $C_6$–$C_{10}$ aromatic hydrocarbon groups, and most preferably, one or more $C_6$–$C_{10}$ aromatic hydrocarbon groups which contain one or more, preferably at least two, —$COOR^1$ groups wherein $R^1$ is H, metal, ammonium, $C_1$–$C_6$ alkyl, or $C_6$–$C_{10}$ aryl.

In a most preferred compound (II), R will contain at least one $C_6$–$C_{10}$ aromatic hydrocarbon group and at least two —$COOR^1$ groups wherein $R^1$ is H, metal, ammonium, $C_1$–$C_6$ alkyl, or $C_6$–$C_{10}$ aryl. $R^1$ will most preferably be a $C_1$–$C_6$ alkyl or a $C_6$–$C_{10}$ aryl group.

The —$COOR^1$ groups may be lateral or terminal. It will be appreciated that when $R^1$ is H, compound (II) will comprise one or more free carboxylic acid groups. Similarly, when $R^1$ is a metal or ammonium ion, compound (II) will have one or more carboxylic acid salt groups. Finally, when $R^1$ is a $C_1$–$C_6$ alkyl or a $C_6$–$C_{10}$ aryl, compound (II) will comprise one or more ester groups.

It will be appreciated that suitable compounds (II) can and most preferably will comprise mixtures of compounds having the formula:

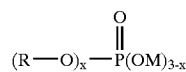

wherein R, M, x, and $R^1$ are as described above. However, in a most preferred embodiment, such a mixture will contain one or more molecules having the above structure wherein x is 1 or 2, preferably 1, R has at least one $C_6$–$C_{10}$ aromatic hydrocarbon group substituted with at least one, preferably two, —$COOR^1$ groups wherein $R^1$ is H or a $C_1$–$C_6$ alkyl or $C_6$–$C_{10}$ aryl, most preferably a $C_1$–$C_6$ alkyl, and M is H.

Compound (II) will generally have a number average molecular weight in the range of from 600 to 1200, preferably from 700 to 900, and most preferably from 750 to 850. Compound (II) will generally have a polydispersity of from 1.00 to 2.00, with a polydispersity of 1.00 to 1.50 being preferred and a polydispersity of 1.15 to 1.35 being most preferred.

Suitable compounds (II) will also have an acid number in the range of from 50 to 200 mg KOH/g, preferably from 100 to 180 mg KOH/g, and most preferably from 120 to 160 mg KOH/g. In addition, suitable compounds (II) will have a hydroxyl number in the range of from 100 to 250 mg KOH/g, preferably from 120 to 230 mg KOH/g, and most preferably from 150 to 200 mg KOH/g.

Suitable compounds (II) generally comprise the reaction product of (a) at least one difunctional polyol, (b) phosphoric acid, and (c) at least one trifunctional carboxylic acid.

Examples of suitable difunctional polyols (a) include neopentanediol, ethylene glycol, diethylene glycol, propylene glycol, dipropylene glycol, hydrogenated bisphenol A, 1,6-hexanediol, hydroxypivalylhydroxypivalate, cyclohexanedimethanol, 1,4-butanediol, 2-ethyl-1,3-hexandiol, 2,2,4-trimethyl-1,3-pentandiol, 2-ethyl-2-butyl-1,3-propanediol, 2-methyl-1,3-propanediol, and mixtures thereof. Preferred difunctional polyols (a) are neopentane diol and 2-ethyl-2-butyl-1,3-propanediol, with neopentane diol being most preferred.

The at least one trifunctional carboxylic acid (c) may be aromatic or aliphatic in nature, but aromatic containing structures are most preferred. Examples of suitable trifunctional carboxylic acids are trimellitic acid, 1,3,5-benzenetricarboxylic acid, citric acid, and mixtures thereof. Preferred trifunctional carboxylic acids are 1,3,5-benzenetricarboxylic acid and trimellitic acid, with trimellitic acid being most preferred. Phosphoric acid (c) is as described above with respect to (I(d)).

Polymerization of the reactants (a), (b), and (c) may occur at typical esterification conditions, ie., 200–230° C. reaction temperature while continuously removing water as a reaction by-product. Solvents that facilitate the removal of water from the reaction system (those that form an azeotrope) such as xylenes, may be used. The reaction can also be subsequently admixed with suitable solvents.

Reactants (a), (b), and (c) will generally be used in a ratio of 6.3:3.0:0.05 to 7.9:4.0:0.15, preferably from 6.7:3.2:0.07 to 7.6:3.8:0.12, and most preferably from 6.9:3.3:0.09 to 7.3:3.5:0.11.

A commercially available and most preferred example of compound (II) is LUBRIZOL™ 2063, available from the Lubrizol Corp of Wickliffe, Ohio. Compound (III) is a compound that provides low surface tension and promotes surface wetting. The compound has a moderate affinity for water and provides coupling capability with any phosphoric acid that may be present. Preferably compound (III) is a solvent selected from the group consisting of isobutyl isobutyrate, diisobutyl ketone, methyl amyl acetate, propylene glycol propyl ether and propylene glycol tertiary butyl ether, propylene glycol propyl ether, mixtures thereof. Most preferably Compound (III) is propylene glycol tertiary butyl ether.

Compound (I) will typically comprise from 1 to 20% by weight of the mixture of compounds (I), (II) and (III), preferably from 5 to 15% by weight, and most preferably from 10 to 15% by weight, based on the total weight of the mixture of compounds (I), (II) and (III). Compound (II) will comprise from 0.5 to 10% by weight of the mixture of compounds (I), (II) and (III), preferably from 2 to 10% by weight, and most preferably from 5 to 10% by weight, based on the total weight of the mixture of compounds (I), (II) and (III). Compound (III) will typically comprise from 65 to 90% by weight of the mixture of compounds (I), (II) and (III), and more preferably from 70 to 85% by weight of the mixture of compounds (I), (II) and (III).

The composition comprising the mixture of compounds (I), (II) and (III) will typically be present in a coating composition in an amount of from 0.5 to 5.0% by weight, preferably from 1.5 to 5.0%, and most preferably from 1.5 to 3.0% by weight, based on the total nonvolatile weight of the coating composition.

The mixture of compounds (I), (II) and (III) may be incorporated into finished coating compositions by conventional mixing techniques using mixing equipment such as a mechanical mixer, a cowles blade, and the like. Although the additives may be added during the manufacturing process or subsequently to a finished coating, those skilled in the art will appreciate that in a most preferred embodiment, the additives will be added post grind during the manufacturing process. Although the mixture of compounds (I) (II) and (III) may be used in single or two component systems, use in two-component systems is preferred, particularly where the mixture of compounds (I), (II) and (III) is placed in the resin component of a two component system.

Finally, although a variety of packaging options are suitable for containing the coating compositions of the invention, it is most preferred that coating compositions containing the mixture of compounds (I), (II) and (III) be packaged in epoxy or phenolic lined cans. Packaging in such containers has been found to ensure the retention of optimum adhesion characteristics.

The mixture of compounds (I), (II) and (III) when used in coating compositions provides improved adhesion of the coating composition to bare untreated metal substrates, including aluminum and galvanized steel substrates.

Coating compositions of the invention comprising the mixture of compounds (I) (II) and (III) may comprise any of the film-forming components used in the refinish coatings industry. Such coating compositions may rely on air dry lacquer film formation, film formation via chemical crosslinking, or a combination thereof. Thermosetting films produced by chemical crosslinking are most preferred.

Thermosetting coatings of the invention will comprise at least one film-forming polymer and at least one crosslinking agent. The film-forming polymer will comprise one or more functional groups reactive with one or more functional groups on the crosslinking agent. Examples of functional group combinations useful for the production of crosslinked coatings include, but are not limited to, active-hydrogen and isocyanate, epoxide and carboxylic acid, hydroxyl/carboxylic acid and/or urea-formaldehyde/melamine-formaldehyde, epoxide and amine, and the like.

Although the film-forming polymer may contain any functional group reactive with the functional group present on the crosslinking agent, preferably the functional group present on the film-forming polymer is at least one functional group selected from the group consisting of hydroxyl, amine, carboxylic acid, epoxy and mixtures thereof. Especially preferred functional groups for use on the film-forming polymer are hydroxyl groups and amine groups, with hydroxyl groups being most preferred.

Examples of suitable film-forming polymers are acrylic polymers, polyurethane polymers, polyesters, alkyds, polyamides, epoxy group containing polymers, and the like.

Particularly preferred film forming polymers will be difunctional, generally having an average functionality of about two to eight, preferably about two to four. These compounds generally have a number average molecular weight of from about 400 to about 10,000, preferably from 400 to about 8,000. However, it is also possible to use low molecular weight compounds having molecular weights below 400. The only requirement is that the compounds used as film-forming polymers not be volatile under the heating conditions, if any, used to cure the compositions.

More preferred compounds containing reactive hydrogen groups are the known polyester polyols, polyether polyols, polyhydroxyl polyacrylates, polycarbonates containing hydroxyl groups, and mixtures thereof. In addition to these preferred polyhydroxyl compounds, it is also possible to use polyhydroxy polyacetals, polyhydroxy polyester amides, polythioether containing terminal hydroxyl groups or sulphydryl groups or at least difunctional compounds containing amino groups, thiol groups or carboxy groups. Mixtures of the compounds containing reactive hydrogen groups may also be used.

In a most preferred embodiment of the invention, the film forming polymer reactable with the crosslinking agent is an acrylic resin, which may be a polymer or oligomer. The acrylic polymer or oligomer preferably has a number average molecular weight of 500 to 1,000,000, and more preferably of 1000 to 20,000. Acrylic polymers and oligomers are well-known in the art, and can be prepared from monomers such as methyl acrylate, acrylic acid, methacrylic acid, methyl methacrylate, butyl methacrylate, cyclohexyl methacrylate, and the like. The active hydrogen functional group, e.g., hydroxyl, can be incorporated into the ester portion of the acrylic monomer. For example, hydroxy-functional acrylic monomers that can be used to form such resins include hydroxyethyl acrylate, hydroxybutyl acrylate, hydroxybutyl methacrylate, hydroxypropyl acrylate, and the like. Amino-functional acrylic monomers would include t-butylaminoethyl methacrylate and t-butylaminoethylacrylate. Other acrylic monomers having active hydrogen functional groups in the ester portion of the monomer are also within the skill of the art.

Modified acrylics can also be used. Such acrylics may be polyester-modified acrylics or polyurethane-modified acrylics, as is well-known in the art. Polyester-modified acrylics modified with e-caprolactone are described in U.S. Pat. No. 4,546,046 of Etzell et al, the disclosure of which is incorporated herein by reference. Polyurethane-modified acrylics are also well-known in the art. They are described, for example, in U.S. Pat. No. 4,584,354, the disclosure of which is incorporated herein by reference.

Polyesters having active hydrogen groups such as hydroxyl groups can also be used as the film forming polymer in the composition according to the invention. Such polyesters are well-known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

Polyurethanes having active hydrogen functional groups are also well-known in the art. They are prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, trimethylol propane). They can be provided with active hydrogen functional groups by capping the polyurethane chain with an excess of diol, polyamine, amino alcohol, or the like.

Although polymeric or oligomeric active hydrogen components are often preferred, lower molecular weight non-polymeric active hydrogen components may also be used in some applications, for example aliphatic polyols (e.g., 1,6-hexane diol), hydroxylamines (e.g., monobutanolamine), and the like.

Examples of suitable crosslinking agents include those compounds having one or more functional groups reactive with the functional groups of the film-forming polymer. Examples of suitable crosslinking agents include isocyanate functional compounds and aminoplast resins, epoxy functional compounds, acid functional compounds and the like. Most preferred crosslinkers for use in the coating compositions of the invention are isocyanate functional compounds.

Suitable isocyanate functional compounds include polyisocyanates which are aliphatic, including cycloaliphatic polyisocyanates, or aromatic. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, hexamethylene diisocyanate (HDI), 1,4-methylene bis-(cyclohexylisocyanate) and isophorone diisocyanate. Useful aromatic diisocyanates include the various isomers of toluene diisocyanate, meta-xylenediioscyanate and para-xylenediisocyanate, also 4-chloro-1,3-phenylene diisocyanate, 1,5-tetrahydronaphthalene diisocyanate, 4,4'-dibenzyl diisocyanate and 1,2,4-benzene triisocyanate can be used. In addition, the various isomers of alpha.,.alpha.,.alpha.',.alpha.'-tetramethyl xylene diisocyanate can be used.

In a most preferred embodiment, the crosslinking agent will comprise one or more components selected from the group consisting of hexamethylene diisocyanate (HDI), the isocyanurates of HDI, the biurets of HDI, and mixtures thereof, with the isocyanurates and biurets of HDI being particularly preferred.

Suitable isocyanate functional compounds may be unblocked, in which case the coating composition should be utilized as a two component system, i.e., the reactive components combined shortly before application, or they may be blocked. Any known blocking agents, such as alcohols or oximes, may be used.

In a most preferred embodiment of the coating compositions of the invention, the coating composition will be a two-component system with the reactive film forming polymer and the crosslinking agent combined shortly before application. In such an embodiment, the composition of the invention comprising the mixture of compounds (I), (II) and (III) will be preferably incorporated with the film forming polymer containing component.

Additives, such as catalysts, pigments, dyes, leveling agents, and the like may be added as required to the coating compositions of the invention.

The coating compositions of the invention may be stored as such for prolonged periods at room temperature without gel formation or undesirable changes. They may be diluted as required to a suitable concentration and applied by conventional methods, for example, spraying or spread coating, and cured by exposure to ambient temperatures of from 70 to 75° F. for a period of from 1 to 3 hours, preferably from 1.5 to 2 hours. However, sandable films of the coating compositions of the invention comprising mixtures of compounds (I) and (II) may also be obtained upon exposure of the applied coating to temperatures in the range of from at least 120° F., more preferably up to 140° F., for periods of from 30 to 50 minutes, preferably from 30 to 40 minutes.

The invention is further illustrated but is not limited by the following examples in which all parts and percentages are by weight unless otherwise specified.

EXAMPLES

A coating composition (A) according to the invention was prepared as follows by the adding the identified amounts of compounds (I), (II) and (III) to a urethane primer. Additional coating compositions B–E showing the respective effects of varying amounts of compound (III) were also prepared. The resultant mixtures of the urethane primer, and compounds (I), (II) and (III) were shaken for 30 minutes on a Red Devil® paint shaker. The hardener and reducer components were stirred by hand as were the ready to spray mixtures of the combined primers, hardeners, and reducers. Amounts specified are in grams unless indicated otherwise.

| Ingredient | Control | Example A | Example B | Example C | Example D | Example E |
|---|---|---|---|---|---|---|
| BASF 800 K primer[1] | 99.53 g | 98.05 | 97.58 | 96.76 | 96.57 | 96.28 |
| Compound I[2] | 0.28 | 0.28 | 0.28 | 0.28 | 0.28 | 0.28 |
| Compound II[3] | 0.14 | 0.14 | 0.14 | 0.14 | 0.14 | 0.14 |
| Compound III[4] | 0 | 1.48 | 1.95 | 1.77 | 1.96 | 2.25 |
| Hardener[5] | 17.10 | 17.10 | 17.10 | 17.10 | 17.10 | 17.10 |
| Corrosion Inhibitor[6] | 0.05 | 0.05 | 0.05 | 0.05 | 0.05 | 0.05 |
| Carbon Black | 0 | 0 | 0 | 1.0 | 1.0 | 1.0 |

[1] A urethane primer component based on a hydroxy functional acrylic and acrylated polyester resins, comercially available as 800 K from BASF Corporation of Whitehouse, OH.
[2] Borchigen HMP, commercially available from Wolff Walstrode, Bayer Corporation of Burr Ridge, IL.
[3] LUBRIZOL ® 2063, commercially available from Lubrizol Corporation of Wickliffe, OH.
[4] Propylene glycol t-butyl ether solvent sold under the trademark Acrosolve.
[5] An isocyanate based crosslinking component commercially available as DH57 Hardener from BASF Corp.
[6] Irgacore 153 sold by Ciba Specialty Chemicals Corp., USA.

Formulations were sprayed on 240 grit sanded galvanized steel panels and allowed to flash for 5 minutes before being put in 140 F oven. Formulations were then baked at 140° F. for 30 minutes. Table 1 illustrates adhesion of the examples measured after removal from the oven, following the specified time lapse.

TABLE 1

GM-X Adhesion

| | Sample | | | | | |
|---|---|---|---|---|---|---|
| Time Lapse | Control | A | B | C | D | E |
| | | | Adhesion Values | | | |
| 5 Minutes | GM 1 | GM 2 | GM 10 | GM 10 | GM 7 | GM 1 |
| 15 Minutes | GM 1 | GM 5 | GM 10 | GM 10 | GM 6 | GM 6 |
| 30 Minutes | GM 1 | GM 8 | GM 10 | GM 10 | GM 7 | GM 7 |

What is claimed is:
1. A coating having improved adhesion to metal, comprising,
 (I) a first compound having an acid number of from 70 to 120 mg KOH/g, a hydroxyl number of from 200 to 400 mg KOH/g, a number average molecular weight of from 150 to 3000, and which is the reaction product of (a) at least one difunctional carboxylic acid, (b) at least one trifunctional polyol, (c) at least one chain stopper, and (d) phosphoric acid,
 (II) a second compound comprising one or more carboxy phosphate esters having the formula:

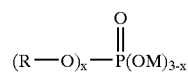

wherein M is hydrogen, metal, or ammonium, x is a number from 0 to 3, R is an $C_5$–$C_{40}$ aliphatic group having one or more —$COOR^1$ groups, wherein $R^1$ is H, metal, ammonium, $C_1$–$C_6$ alkyl, or $C_6$–$C_{10}$ aryl, and
 (III) a third compound comprising one or more solvents providing low surface tension and promoting surface wetting,
wherein said coating applied to a sanded galvanized steel panel and flash dried for 5 minutes and then baked between 120 and 145° F. for 30 minutes, demonstrates a GM adhesion value of 5 or greater following 15 minute time lapse after removal from bake.

2. The composition of claim 1 wherein second compound (II) has an acid number of from 50 to 200 mg KOH/g, a hydroxyl number of from 100 to 250 mg KOH/g, a number average molecular weight of from 600 to 1200 and is the reaction product of (a) at least one difunctional polyol, (b) phosphoric acid, and (c) at least one trifunctional carboxylic acid.

3. The composition of claim 1 wherein compound (I) comprises the reaction product of components (a), (b), (c), and (d) reacted in a molar ratio of from 4.2:4.9:0.01:0.0005 to 5.1:5.6:0.7:0.005.

4. The composition of claim 1 wherein compound (I) comprises an acid number of from 70 to 100 mg KOH/g, a hydroxyl number from 300 to 400 mg KOH/g, a number average molecular weight of from 400 to 600.

5. The composition of claim 1 comprising from 1 to 20% by weight of compound (I), from 0.5 to 10% by weight of compound (II), and from 65% to 90% by weight of compound (III), each based on total weight of the mixture of compounds (I), (II) and (III).

6. The composition of claim 1 wherein compound (III) is selected from the group consisting of isobutyl isobutyrate, diisobutyl ketone, methyl amyl acetate, propylene glycol propyl ether, propylene glycol tertiary butyl ether and mixtures thereof.

7. The composition of claim 1 wherein
 the at least one difunctional carboxylic acid (Ia) is selected from the group consisting of adipic acid, azeleic acid, fumaric acid, phthalic acid, sebacic acid, maleic acid, succinic acid, isophthalic acid, tetrahydrophthalic acid, hexahydrophthalic acid, dimer fatty acids, itaconic acid, glutaric acid, cyclohexanedicarboxylic acid, and mixtures thereof,
 the at least one trifunctional polyol (Ib) is selected from the group consisting of trimethylolpropane, trimethylol ethane, glycerine, 1,2,4-butanetriol, and mixtures thereof, and the at least one chain stopper (Ic) is selected from the group consisting of para-t-butyl benzoic acid, benzoic acid, salicylic acid, 2-ethylhexanoic acid, pelargonic acid, isononanoic acid, C$_{18}$ fatty acids, stearic acid, lauric acid, palmitic acid, and mixtures thereof.

8. The composition of claim 2 wherein
the at least one difunctional polyol (IIa) is selected from the group consisting of neopentanediol, ethylene glycol, diethylene glycol, propylene glycol, dipropylene glycol, hydrogenated bisphenol A, 1,6-hexanediol, hydroxypivalylhydroxypivalate, cyclohexanedimethanol, 1,4-butanediol, 2-ethyl-1,3-hexanediol, 2,2,4-trimethyl-1,3-pentandiol, 2-ethyl-2-butyl-1,3-propanediol, 2-methyl-1,3-propanediol, and mixtures thereof, and
the at least one trifunctional carboxylic acid (IIc) is selected from the group consisting of trimellitic acid, 1,3,5-benzenetricarboxylic acid, citric acid, and mixtures thereof.

9. The composition of claim 8 wherein the at least one difunctional carboxylic acid (Ia) is adipic acid, the at least one trifunctional polyol (Ib) is trimethyolopropane and the at least one chain stopper (Ic) is para-t-butyl benzoic acid.

10. The composition of claim 8 wherein the at least one difunctional polyol (IIa) is neopentanediol and the at least one trifunctional carboxylic acid (IIc) is trimellitic acid.

11. A method of improving adhesion of a cured coating composition to bare metal comprising
A) providing a coating composition according to claim 1,
B) applying said coating composition to bare metal,
C) baking said coating composition to cure, at a temperature of between 120 and 145° F. for a time between 20 and 40 minutes,
wherein said coating demonstrates a GM adhesion value of 5 or greater following a cooling period of 15 minutes following bake.

12. The method of claim 11 wherein compound (III) is selected from the group consisting of isobutyl isobutyrate, diisobutyl ketone, methyl amyl acetate, propylene glycol tertiary butyl ether, propylene glycol propyl ether and mixtures thereof.

13. The method of claim 11 wherein the coating composition provided further comprises a resin comprising one or more active hydrogen groups and a crosslinking agent reactive with the resin comprising one or more active hydrogen groups.

14. The method of claim 13 wherein compound (III) is selected from the group consisting of isobutyl isobutyrate, diisobutyl ketone, methyl amyl acetate, propylene glycol tertiary butyl ether, propylene glycol propyl ether and mixtures thereof.

15. A coating composition comprising
a film forming compound,
(I) a first compound having an acid number of from 70 to 120 mg KOH/g, a hydroxyl number of from 200 to 400 mg KOH/g, a number average molecular weight of from 150 to 3000, and which is the reaction product of (a) at least one difunctional carboxylic acid, (b) at least one trifunctional polyol, (c) at least one chain stopper, and (d) phosphoric acid,
(II) a second compound comprising one or more carboxy phosphate esters having the formula:

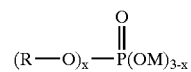

wherein M is hydrogen, metal, or ammonium, x is a number from 0 to 3, R is an C$_5$–C$_{40}$ aliphatic group having one or more —COOR$^1$ groups, wherein R$^1$ is H, metal, ammonium, C$_1$–C$_6$ alkyl, or C$_6$–C$_{10}$ aryl, and
(III) a third compound selected from the group consisting of isobutyl isobutyrate, diisobutyl ketone, methyl amyl acetate and propylene glycol tertiary butyl ether and mixtures thereof.

16. The coating composition of claim 15 wherein the film forming compound is comprised of an acrylic resin and an isocyanate functional crosslinking agent.

17. The coating composition of claim 15 which is a primer composition.

18. The coating composition of claim 15 comprising from 1.5 to 3.00% by weight of the mixture of compounds (I) (II) and (III), based on the total nonvolatile weight of the coating composition.

19. A two component coating composition comprising
a first component (A) comprising
a resin comprising one or more active hydrogen groups,
(I) a first compound having an acid number of from 70 to 120 mg KOH/g, a hydroxyl number of from 200 to 400 mg KOH/g, a number average molecular weight of from 150 to 3000, and which is the reaction product of (a) at least one difunctional carboxylic acid, (b) at least one trifunctional polyol, (c) at least one chain stopper, and (d) phosphoric acid, and
(II) a second compound comprising one or more carboxy phosphate esters having the formula:

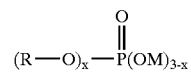

wherein M is hydrogen, metal, or ammonium, x is a number from 0 to 3, R is an C$_5$–C$_{40}$ aliphatic group having one or more —COOR$^1$ groups, wherein R$^1$ is H, metal, ammonium, C$_1$–C$_6$ alkyl, or C$_6$–C$_{10}$ aryl, and
(III) a compound selected from the group consisting of isobutyl isobutyrate, diisobutyl ketone, methyl amyl acetate and propylene glycol tertiary butyl ether and mixtures thereof, and
a second component (B) comprising a crosslinking agent reactive with the resin comprising one or more active hydrogen groups.

20. A method of improving adhesion of a cured coating composition to bare metal comprising
A) applying said coating composition according to claim 19 to bare metal, and
B) baking said coating composition to cure, at a temperature of between 120 and 145° F. for a time between 20 and 40 minutes,
wherein said coating demonstrates a GM adhesion value of 5 or greater following a cooling period of 15 minutes following bake.

* * * * *